(12) United States Patent
Yokomae et al.

(10) Patent No.: US 6,519,420 B1
(45) Date of Patent: Feb. 11, 2003

(54) VIEWFINDER APPARATUS FOR CAMERA

(75) Inventors: Yoshihiro Yokomae, Kokubunji (JP); Wataru Koide, Hachioji (JP)

(73) Assignee: Olympus Optical Co., Ltd. (JP)

( * ) Notice: Subject to any disclaimer, the term of this patent is extended or adjusted under 35 U.S.C. 154(b) by 0 days.

(21) Appl. No.: 09/575,959

(22) Filed: May 23, 2000

(30) Foreign Application Priority Data

May 26, 1999 (JP) .......................................... 11-147085

(51) Int. Cl.[7] .......................... G03B 13/14; G03B 13/10
(52) U.S. Cl. ........................ 396/377; 396/149; 396/378
(58) Field of Search .......................... 396/84, 148, 149, 396/377, 378, 379, 435, 436

(56) References Cited

U.S. PATENT DOCUMENTS

| | | | | |
|---|---|---|---|---|
| 5,266,992 A | * | 11/1993 | Takaoka et al. | 396/84 |
| 5,410,381 A | * | 4/1995 | Kameyama et al. | 396/378 |
| 5,815,746 A | * | 9/1998 | Masuda | 396/81 |
| 5,875,361 A | * | 2/1999 | Noto | 396/132 |
| 5,946,510 A | * | 8/1999 | Kobayahi et al. | 396/380 |

FOREIGN PATENT DOCUMENTS

JP        8-304884        11/1996

* cited by examiner

*Primary Examiner*—Russell Adams
*Assistant Examiner*—Arthur A Smith
(74) *Attorney, Agent, or Firm*—Ostrolenk, Faber, Gerb & Soffen, LLP

(57) ABSTRACT

Disclosed is a viewfinder apparatus for a camera, comprising: a curvilinear image-forming surface in a viewfinder optical system independent of a photographic optical system; a field frame disposed adjacent to the image-forming surface for defining a reference field of view, the field frame being formed into a curvilinear shape such as to match in profile with the image-forming surface; a field-correcting frame for correcting the field of view defined by the field frame, the field-correcting frame being supported on an arm portion that is pivoted about a revolving shaft in a direction normal to an optical axis of the viewfinder optical system, the field-correcting frame being formed into a curvilinear shape such as to correspond in profile with the image-forming surface; and a motor for driving the field-correcting frame into movement along the image-forming surface, whereby the field-correcting frame of the viewfinder optical system is invariably viewed.

23 Claims, 5 Drawing Sheets

VIEWFINDER APPARATUS FOR CAMERA

BACKGROUND OF THE INVENTION

1. Field of the Invention

The present invention relates to a viewfinder apparatus for a camera and, more particularly, to a viewfinder apparatus for a camera including a viewfinder optical system independent of a photographic optical system.

2. Related Art Statement

In a camera having a viewfinder optical system that is independent of a photographic optical system, it is known that a difference in the optical axis between the photographic optical system and the viewfinder optical system brings about a difference (hereinafter called a parallax) in the field of view between these two optical systems.

The parallax varies depending on the distance of the object, that is to be photographed, from the camera. In addition, when the photographic optical system is of a zoom type, the parallax also varies with a focal length thereof.

Such a parallax is conspicuous particularly for short range photography. In order to allow a user to recognize a correct field of vision, visual field correction (parallax correction) is preferably performed so as to match a photographic range with a range of a viewfinder field as much as possible.

In order to provide the parallax correction in the viewfinder optical system, a device has been proposed, in which a field-correcting frame is positioned in close proximity to an image-forming surface of the viewfinder optical system, and is further moved in a direction vertical to the optical axis of the viewfinder optical system, thereby allowing the user to appreciate the photographic range.

As one example of the above, a device for detecting an object distance and then correcting the parallax in a non-staged manner in accordance with such object distance information is described in published Japanese Patent Application Laid-Open No. (Hei) 8-304884.

More specifically, in such a parallax-correcting apparatus as taught in the above publication, a correction quantity-calculating means calculates a correction amount of the parallax on the basis of information on a focal length of the photographic optical system and information on the distance of the object being photographed. Then, the field-correcting frame disposed adjacent to the image-forming surface of the viewfinder optical system is moved in the direction normal to the optical axis of the viewfinder optical system in response to a correction signal that is fed from the correction quantity-calculating means. As a result, the parallax is corrected in a non-staged fashion. Such parallax correction makes it possible to provide the user with a proper viewfinder field at any photographic distance.

However, as given in the above publication, the field-correcting frame is designed to merely move in the direction normal to the optical axis of the viewfinder optical system. This causes an inconvenience in that the field-correcting frame is deviated from the normally curvilinear-shaped image-forming surface of the viewfinder optical system at certain positions during movement, which results in the field-correcting frame being viewed differently.

More specifically, a position at which an image is formed is slightly varied in the direction of the optical axis in a range between a central portion of a field image and its surrounding portion, which field image is formed by means of an objective optical system of the viewfinder optical system. As a result, a diopter is found to be varied in the range between the center of the field image and its peripheral portion when the viewfinder is visually observed. Consequently, when the field frame and the field-correcting frame are merely positioned at a surface vertical to the optical axis, or alternatively are merely driven along such a vertical surface, the field image formed by means of the objective optical system, the field frame, and the field-correcting frame is visually observed at different diopters, depending upon positions in the direction of the optical axis.

OBJECT AND SUMMARY OF THE INVENTION

In view of the above, an object of the present invention is to provide a viewfinder apparatus for a camera, designed to allow a visual field of a viewfinder optical system, a field frame, and a field-correcting frame to be invariably viewed.

In brief, one aspect of the present invention provides a viewfinder apparatus for a camera including a viewfinder optical system independent of a photographic optical system, comprising: a correction amount-calculating means for calculating a correction amount of parallax between the viewfinder optical system and the photographic optical system on the basis of information concerning at least one of a focal length of the photographic optical system and an object's distance; a field frame for defining a reference visual field of the viewfinder optical system; a field-correcting frame for correcting the visual field defined by the field frame; and a field variable mechanism for permitting the field-correcting frame to be driven both in a direction vertical to an optical axis of the viewfinder optical system and in a direction of the optical axis of the viewfinder optical system in accordance with the correction amount of parallax calculated by the correction amount-calculating means.

Another aspect of the present invention provides a viewfinder apparatus for a camera, comprising: a viewfinder optical system separate from a photographic optical system, which is for photographing an image of an object; a field-correcting frame for correcting a parallax between the photographic optical system and the viewfinder optical system; a first driving mechanism for driving the field-correcting frame in a direction substantially vertical to an optical axis of the viewfinder optical system; and, a second driving mechanism for driving the field-correcting frame in a direction of the optical axis of the viewfinder optical system.

Yet another aspect of the present invention provides a viewfinder apparatus for a camera, comprising: a viewfinder optical system, through which an object can be observed visually; and a display member movable both in a direction substantially vertical to an optical axis of the viewfinder optical system and in a direction of the optical axis of the viewfinder optical system, the display member being inserted into a visual field of the viewfinder apparatus, thereby allowing the display member to be visually observed.

A further aspect of the present invention provides a viewfinder apparatus for a camera, comprising: a viewfinder optical system for visually observing an image of an object; a field frame for defining a field range of the viewfinder apparatus; and a field-correcting frame for changing the field range defined by the field frame, wherein the field-correcting frame is visually observed at an invariable diopter when the field range is changed.

These object and advantages of the present invention will become further apparent from the detailed explanation.

DETAILED DESCRIPTION OF THE PREFERRED EMBODIMENTS

Embodiments of the present invention will now be described with reference to the drawings.

Figure 1:
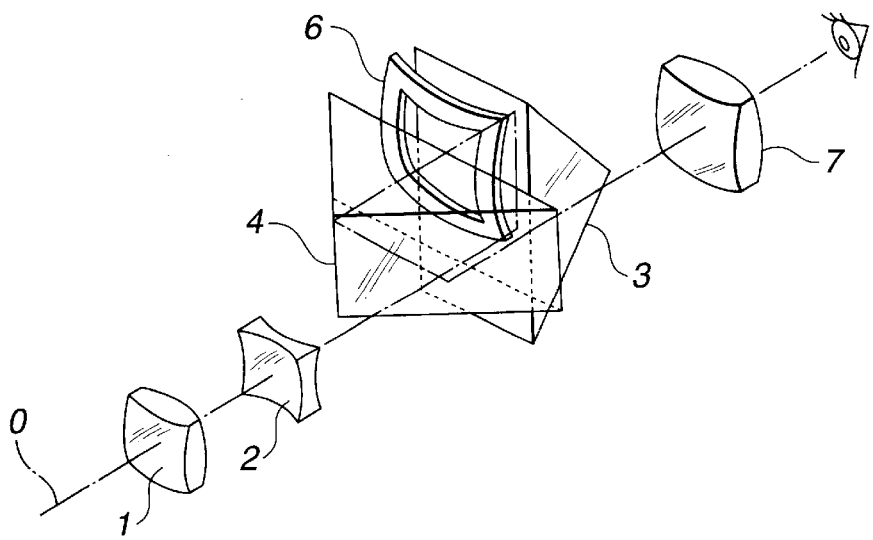
FIG. 1 is a perspective view, illustrating how an image-type viewfinder optical system for use in a camera is constructed according to a first embodiment of the present invention.
Figure 2:
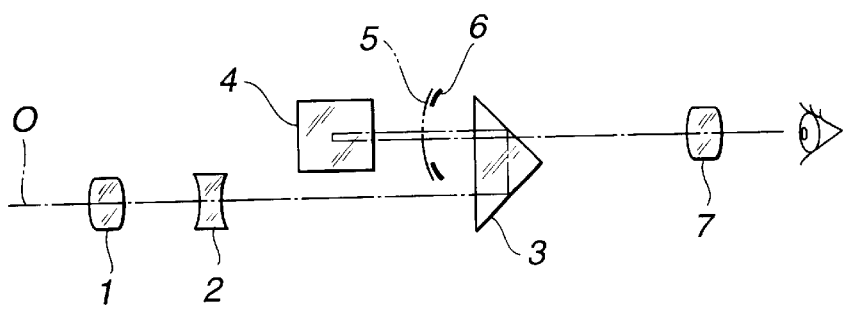
FIG. 2 is a side view, of the viewfinder optical system in FIG. 1.
Figure 3:
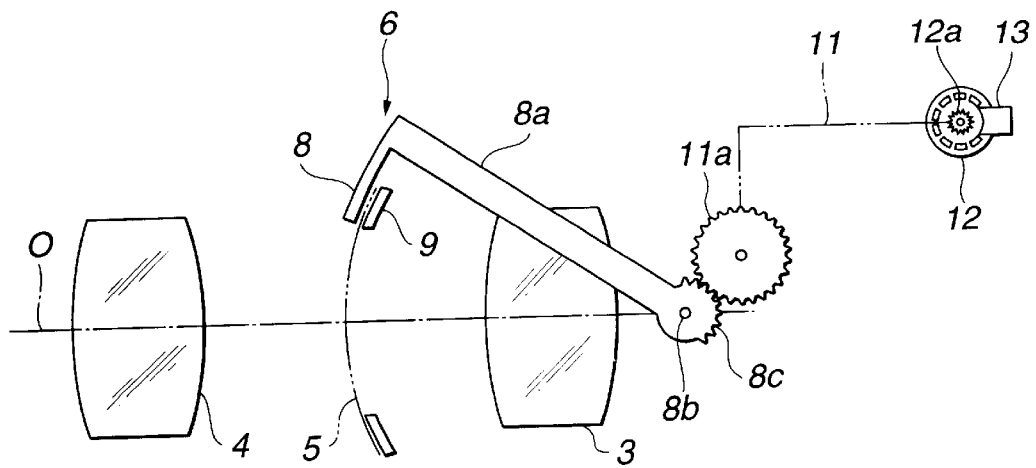
FIG. 3 is an illustration of further structural details of a field frame portion of the viewfinder optical system in the first embodiment.
Figure 4A:
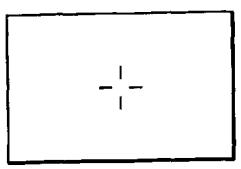
FIG. 4A is a representation of a viewfinder field prior to correction in the first embodiment.
Figure 4B:
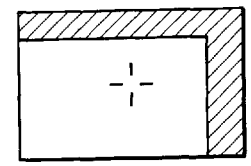
FIG. 4B is a representation of a viewfinder field after correction in the first embodiment.
Figure 5:
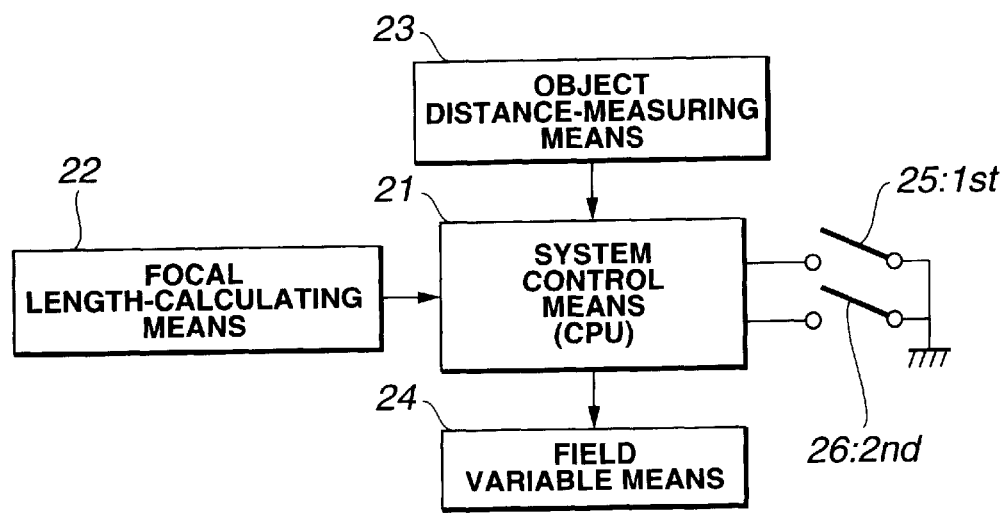
FIG. 5 is a block diagram, of the camera's operation according to the first embodiment.
Figure 6:
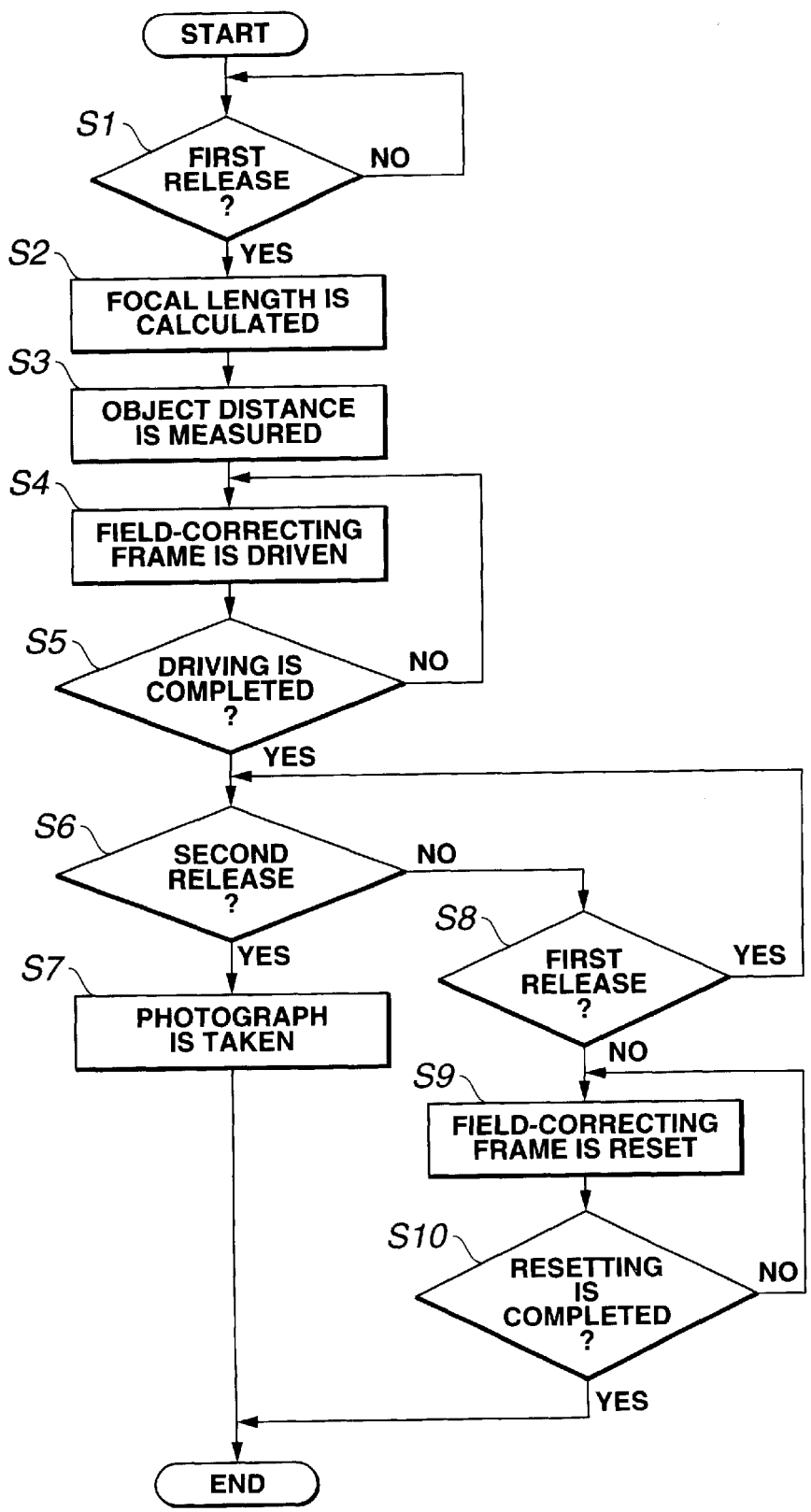
FIG. 6 is a flowchart, illustrating a course of operation in the camera according to the first embodiment.

FIGS. 1–6 illustrate a first embodiment of the present invention. FIG. 1 is a perspective view, illustrating the structure of an image-type viewfinder optical system for use in a camera. FIG. 2 is a side view of the viewfinder optical system of FIG. 1. FIG. 3 shows further structural details of a field frame portion of the viewfinder optical system. FIG. 4A is an illustration of a viewfinder field prior to correction. FIG. 4B is an illustration of a viewfinder field after correction. FIG. 5 illustrates how the camera is systematized. FIG. 6 is a flowchart of a course of action in the camera.

The camera includes a viewfinder optical system, which is independent of a photographic lens that is used to form an image of an object on a sheet of film or an imaging element. The viewfinder optical system is of a real image type.

More specifically, referring to FIGS. 1 and 2, the viewfinder optical system is shown including objective lenses 1 and 2, a first prism 3, a field frame portion 6, a second prism 4, and an eyepiece 7. The objective lens 1 has a positive power. The objective lens 2 is positioned behind the objective lens 1 on the optical axis "O". The objective lens 2 has a negative power. The first prism 3 is provided behind the objective lens 2 on the optical axis "O". The first prism 3 is a triangle prism, on which incident light is reflected in an upward direction and then in a forward direction. The field frame portion 6 is disposed adjacent to an image-forming surface 5 for defining a viewfinder field. The light passed through the first prism 3 first forms an image on the image-forming surface 5. The light then travels through the field frame portion 6 and is reflected inside the second prism 4 in a sideward direction and then in a rearward direction toward the eyepiece 7. The eyepiece 7 allows image of the object formed on the image-forming surface 5 through the second prism 4 to be viewed on a magnified scale.

In the viewfinder optical system having such a structure, a combination of such a pair of the objective lenses 1, 2 forms an objective optical system having a positive power as a whole. In addition, a combination of the first prism 3 and the second prism, 4 forms an erect image optical system. The eyepiece 7 forms an ocular optical system.

The image-forming surface 5 positioned between the first and second prisms 3 and 4, on which the image of the object is formed by means of the objective optical system, is normally curvilinear. The erect image optical system forms an upside down real image formed on the image-forming surface 5 in reversed right and left sides, which image is then to be converted into an erect image.

Further structural details on the above field frame portion 6 will now be described with reference to FIG. 3. Note that the first and second prisms 3, 4 in FIG. 3 are roughly illustrated as optical elements.

As previously described, the image-forming surface 5 located between the first and second prisms 3, 4 has a curvilinear shape. A field frame 9 is provided in close proximity to the image-forming surface 5 for defining a reference visual field of the viewfinder optical system. The field frame 9 is designed to provide a field of view for visually observing an object located infinitely remote at certain focal length.

The field frame 9 is shown having a curvilinear shape to extend along the curvilinear profile of the image-forming surface 5. This configuration allows any portion of the field frame 9 to be invariably viewed in the viewfinder field.

Further, a field-correcting frame 8 is provided so as to overlap the field frame 9. Similar to the field frame 9, the field-correcting frame 8, has a curvilinear figure to extend along the arcuate image-forming surface 5. The field-correcting frame 8 is integrally supported on an arm portion 8a.

The arm portion 8a is pivotably supported at its proximal end on a revolving shaft 8b oriented in a direction vertical to optical axis "O". The proximal end of the arm portion 8a includes a gear portion 8c.

The gear portion 8c is in mesh with one end of a gear 11a of a driving force-transmitting mechanism 11.

The other end of the driving force-transmitting mechanism 11 is engaged with a pinion gear 12a that is mounted on a motor 12. The motor 12 is the driving source of the above mechanism 11.

The motor 12 has a photo-interrupter 13 mounted thereon for detecting how the motor 12 is rotated.

Thus, a driving force from the motor 12 is transmitted to the gear portion 8c through the driving force-transmitting mechanism 11, thereby moving the field-correcting frame 8 about the shaft 8b. This arrangement allows the field-correcting frame 8 to be moved both in the direction normal to the optical axis "O" and in the direction of the optical axis "O".

FIG. 5 illustrates an electrical constitution of the camera.

More specifically, the camera includes a focal length-calculating means 22, an object distance-measuring means 23, a field variable means 24, a first release switch 25, a second release switch 26, and a system control means 21. The focal length-calculating means 22 provides information on a focal length of the photographic lens. The object distance-measuring means 23 measures an object's distance. The field variable means 24 includes the driving force-transmitting mechanism 11, the motor 12, the photo-interrupter 13, and so on. The first release switch 25 is turned on by one-step pressing of a release button. The second release switch 26 is switched on by two-step pressing of the release button. The system control means 21 is a correction amount-calculating means, which includes a CPU or its equivalent. The system control means 21 detects how the release switches 25, 26 are operated, and further acquires respective detection results from the focal length-calculating means 22 and the object distance-measuring means 23, thereby calculating a correction amount of parallax. The system control means 21 then provides control over the field variable means 24 on the basis of such a parallax correction amount.

Under the control of the system control means 21 as described above, the field variable means 24 controls the rotation of the motor 12, while detecting the driving of the motor 12 with reference to output from the photo-interrupter 13. Such controlled rotation of the motor 12 moves the field-correcting frame 8, thereby varying the viewfinder field.

Next, a course of action in such a structured camera will be described with reference to FIG. 6.

When the course of action is initiated, a user waits for the first release switch 25 to be turned on (step S1). When it is detected that the first release switch 25 is on, then the focal length-calculating means 22 detects a focal length of a photographic lens, and then provides information on the detected focal length (step S2). Since the present embodiment is premised on a zoom camera, the focal length of the photographic lens is detected. With a monofocal camera, such information may be provided as a preset value; this does not involve any problem at all.

Then the object distance-measuring means 23 measures an object's distance, and then provides information on the object's distance (step S3).

The system control means 21 executes control over the field variable means 24 on the basis of the information on the focal length and the object's distance, and then drives the motor 12 (step S4). The driven motor 12 brings the field-correcting frame 8 into rotational movement along the image-forming surface 5 about the shaft 8b.

The field variable means 24 measures the rotational amount of the motor 12 with reference to output from the photo-interrupter 13, and then determines as to whether or not the motor 12 has been rotated by a predetermined amount (step S5). When the motor 12 has not been rotated by such a specified amount, then the routine is returned to step S4, at which the motor 12 is driven again until the rotational amount of the motor 12 reaches the predetermined amount.

When it is detected that the field-correcting frame 8 has been moved to a position adequate for both the object distance and the focal length of the photographic lens, and further that the driving of the motor 12 has been completed, then a determination is made as to whether the second release switch 26 has been turned on (step S6).

When it is detected that the second release switch 26 is on, a photograph is taken in accordance with a normal sequence action (step S7). Then, the routine is brought to an end.

When it is determined at step S6 that the second release switch 26 is still off, then the first release switch 25 is checked again to determine if the first release switch 25 is on (step S8). When the first release switch 25 is still on, then the routine is returned to step S6, at which the user waits for the second release switch 26 to be turned on. However, when it is determined at step 8 that the first release switch 25 is also off, then this means that a photographer temporarily has stopped a photographic action. In this case, the field variable means 24 drives the motor 12 to drive the field-correcting frame 8 in a direction in which the field-correcting frame 8 is moved out of an image plane defined by the field frame 9 (step S9).

At this time, the rotational amount of the motor 12 is measured with reference to the output from the photo-interrupter 13, thereby determining whether resetting of the field-correcting frame 8 has been completed (step S10).

This course of action is terminated when it is determined that the field-correcting frame 8 has been at a predetermined reset position where the field-correcting frame 8 lies outside the image plane of the field frame 9.

The viewfinder field variable by the field-correcting frame 8 will now be described with reference to FIGS. 4A and 4B.

FIG. 4A represents a state in which the field-correcting frame 8 lies outside the image plane of the field frame 9. The field-correcting frame 8 is located at such a position when an object is fairly remote from the camera and thus parallax is negligible for photography.

FIG. 4B illustrates a state in which the field-correcting frame 8 is advancing into the image plane of the field frame 9. The field-correcting frame 8 is positioned at a location where, the object is close and thus a visual field defined by the field frame 9 must be corrected. At this time, the field-correcting frame 8 is advanced into the visual field of the field frame 9 by different amounts, depending upon both an object's distance and a focal distance of a photographic lens.

Pursuant to the first embodiment, since the field frame is shaped to correspond with the image-forming surface of the viewfinder optical system, the field frame can invariably be viewed. In addition, the field-correcting frame is also shaped to fit in with the image-forming surface of the viewfinder optical system, and is further caused to move along the preceding image-forming surface. As a result, the visual field of the field frame to be corrected by the field-correcting frame can be viewed in a fixed manner.

Furthermore, the field-correcting frame is designed for rotational movement about the revolving shaft in the direction normal to the optical axis of the viewfinder optical system. As a result, the field-correcting frame can be moved both in the direction vertical to the aforesaid optical axis and in the direction of the same optical axis without any complicated mechanism being provided in the camera. This feature makes it feasible to easily establish a certain positional relationship to the curved image-forming surface of the viewfinder optical system.

In the present embodiment, the field frame 6 and the field-correcting frame 8 are curvilinearly formed so as to be consistent in curved profile with the image-forming surface of the objective optical system of the viewfinder optical system. In addition, the field-correcting frame 8 is moved along the curvilinear pattern of the image-forming surface. As a result, the field frame 9, the field-correcting frame 8, and a field image formed by means of the objective optical system can visually be observed at substantially the same diopter at any portion of the viewfinder field. Further, in the ocular optical system (which includes the eyepiece 7, and further which may include the second prism 4) of the viewfinder optical system, a diopter usually has a tendency to be varied when an object on the same plane vertical to the optical axis is visually observed in a range between the center of the optical axis and its surrounding area. Accordingly, the field frame 9 and the field-correcting frame 8 are curvilinearly shaped so as to match with variations in diopter between the center and its surrounding area in the ocular optical system. In addition, the field-correcting frame 8 is moved so as to match with the preceding variations in diopter between the center and its surrounding area in the ocular optical system. As a result, the field frame 9 and the field-correcting frame 8 can always be visually observed at the same diopter.

Furthermore, the field frame 9 and the field-correcting frame 8 are curvilinearly shaped so as to stand at a halfway between: variations in diopter between a central portion and its peripheral portion in the objective optical system (such variations being caused by the curvilinear shape of the image-forming surface 5) and variations in diopter between a central portion and its peripheral portion in the ocular optical system. In addition, the field-correcting frame 8 is driven so as to stand at such a halfway. As a result, variations of the field frame 9 and the field-correcting frame 8 with respect to the field image can be better balanced with variations in how these two frames 8, 9 are viewed (the latter variations refer to the diopter).

Figure 8:
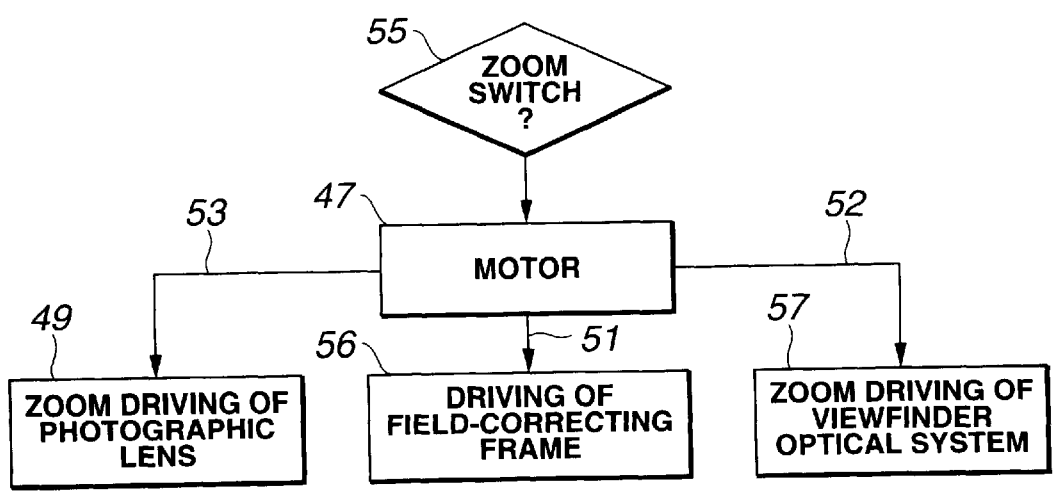
Figure 7:
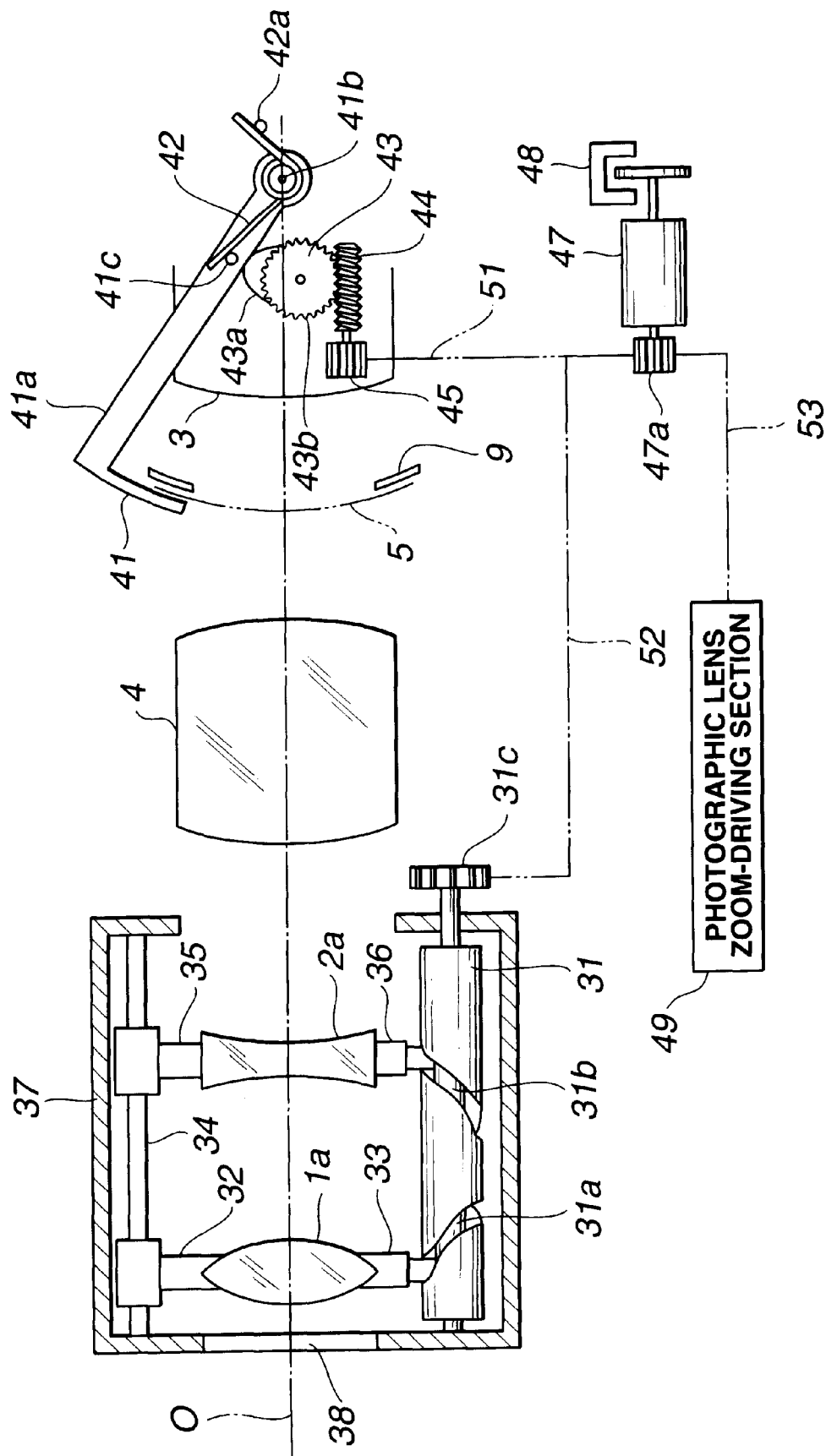
FIG. 7 is an illustration of an image-type viewfinder optical system for use in a camera according to a second embodiment of the present invention; and, FIG. 8 is a block diagram, illustrating how a driving force is distributed in the camera according to the second embodiment.

FIGS. 7 and 8 illustrate a second embodiment of the present invention. FIG. 7 is an illustration, showing a real image-type zoom viewfinder optical system for use in a camera. FIG. 8 is a block diagram, demonstrating how a driving force is distributed in the camera.

In the following description of the second embodiment, descriptions similar to those in the first embodiment will be omitted, and only details different from those in the first embodiment will mainly be provided.

The camera according to the second embodiment is constructed to permit a single driving motor to provide zoom driving of a photographic lens, zoom driving of a viewfinder optical system, and driving of a field-correcting frame.

The viewfinder optical system in the camera is formed as a zoom optical system in which an objective lens 1a having a positive power is supported at its upper end by a lens-supporting member 32, while a lower end of the objective lens 1a rests on a cam follower 33.

Similar to the objective lens 1a, an objective lens 2a having a negative power and located behind the objective lens 1a on optical axis "O" is supported at its upper end by a lens-supporting member 35, while a lower end of the objective lens 2a is carried on a cam follower 36.

The lens-supporting members 32, 35 are pivotally supported on a suspension shaft 34 in a slidable manner. The shaft 34 is disposed parallel to the optical axis "O", and is further fixedly secured at both ends thereof to a mirror frame body 37.

The mirror frame body 37 has a transparent protective member 38 capped thereon at a position in front of the objective lens 1a on the optical axis "O", thereby protecting the objective lens 1a.

The cam followers 33, 36 are engaged with cam grooves 31a, 31b, respectively. The cam grooves 31a, 31b are impressed in a revolving cam 31. The revolving cam 31 is provided parallel to the optical axis "O". The cam 31 is pivotably supported at both ends thereof on, the mirror frame body 37. A gear 31c is rigidly mounted on the cam 31 at one end thereof.

Similar to the first embodiment, first and second prisms 3 and 4, e.g., are disposed behind the objective lens 1a, 2a on optical axis "O" so as to permit a curvilinearly shaped image-forming surface 5 to be positioned between these prisms 3 and 4.

Similar to FIG. 3, FIG. 7 simply illustrates the prisms 3 and 4 as optical elements.

In addition, similar to the first embodiment, a field frame 9 and a field-correcting frame 41 are curvilinearly shaped so as to fit with the curved profile of the image-forming surface 5.

The field-correcting frame 41 is unitarily supported on an arm portion 41a. The arm portion 41a is pivotably supported at its proximal end about a revolving shaft 41b in a direction normal to the optical axis "O".

The arm portion 41a is formed with a spring-hooked portion 41c, on which one end of an urging spring 42 is hooked. A coiled spring, forms the urging spring 42. The urging spring 42 is entrained about the shaft 41b. The other end of the urging spring is hooked on a spring hook 42a that is fixed to a camera body. As a result, the field-correcting frame 41 is spring-biased in a counterclockwise direction in FIG. 7.

The arm portion 41a is positioned against a cam portion 43a of a gear and cam 43 so as to permit the field-correcting frame 41 to be placed at different positions in response to the rotation of the gear and cam 43.

A gear portion 43b of the gear and cam 43 is held in mesh with a worm gear 44. A gear 45 is secured to the worm gear 44 so as to be pivoted in union with the worm gear 44.

The gear 45 is in mesh with one end of a first gear train 51. The other end of the first gear train 51 is engaged with a pinion gear 47a. The pinion gear 47a is rigidly positioned on a revolving shaft of a power source, e.g., a motor 47. This arrangement allows a driving force from the motor 47 to be transmitted to the field-correcting frame 41, thereby moving the field-correcting frame 41.

In addition, the driving force from the motor 47 is transmitted to the gear 31c through a second gear train 52, thereby rotating the cam 31. As a result, the objective lenses 1a, 2a engaged respectively with the cam grooves 31a, 31b and the cam followers 33, 36 are moved back and forth in the direction of the optical axis "O".

Further, the driving force from the motor 47 is transferred to a photographic lens zoom-driving section 49 through a third gear train 53 so as to effect zoom driving of the photographic lens.

A photo-interrupter 48 detects the rotational amount of the motor 47. The motor 47 and the photo-interrupter 48 form a rotational driving means for use in the driving of the field-correcting frame 41, zoom driving of the viewfinder optical system, and zoom driving of the photographic lens.

A course of action to execute parallax correction in a viewfinder apparatus for the camera so constructed will now be described using FIG. 8 with reference to FIG. 7.

A zoom switch 55 is initially operated to rotate the motor 47. The zoom switch 55 is disposed on a camera body for effecting a zooming motion.

The driving force from the motor 47 is transmitted to the gear 45 through the first gear train 51, the cam 31 through the second gear train 52, and the photographic lens zoom-driving section 49 through the third gear train 53.

Initially, the photographic lens zoom-driving section 49 provides zoom driving of the photographic lens.

Thereafter, when the cam 31 is rotated, then the objective lenses 1a, 2a engaged respectively with the cam grooves 31a, 31b and the cam followers 33, 36 are moved along the optical axis "O", thereby effecting zoom driving 57 of the viewfinder optical system (see FIG. 8).

The gear 45 is rotated jointly with the worm gear 44 and the gear and cam 43.

When the gear and cam 43 is turned in a clockwise direction in FIG. 7, then the cam portion 43a thrusts the arm portion 41a of the field-correcting frame 41 in an upward direction against the urging force of the urging spring 42. As a result, the field-correcting frame 41 is rotated about the shaft 41b, and is thereby moved to an adequate position to provide driving of the field-correcting frame 56 (see FIG. 8).

Meanwhile, when the gear and cam 43 are rotated in a counterclockwise direction in FIG. 7, then the urging force of the spring 42 permits the field-correcting frame 41 to be rotationally moved to an appropriate position to execute the driving of field-correcting frame driving 56, while the arm portion 41a is held in abutting contact with the cam portion 43a.

A change in a viewfinder field to be made by the above arrangement is substantially similar to that shown in FIGS. 4A and 4B.

The present embodiment as previously described exhibits effects substantially similar to those in the first embodiment. In addition, zoom driving of the photographic lens, zoom driving of the viewfinder optical system, and parallax correction can be realized simultaneously by means of the single motor disposed in the camera body. Thus, a simpler structure and downsizing of the camera with a consequential reduction in cost is achievable.

In the above described second embodiment, the zoom driving of the photographic lens, the zoom driving of the viewfinder optical system, and the parallax correction are conducted by only one motor; however, the present invention is not limited to the same. For example, a single motor may be provided in the camera in order to effect focus driving of the photographic lens and further to achieve the parallax correction in the viewfinder optical system.

Furthermore, although the above embodiment is premised on the camera having a zoom lens disposed therein as the photographic lens, it goes without saying that the present invention is also applicable to a camera including a monofocal lens as the photographic lens.

Figure 9:
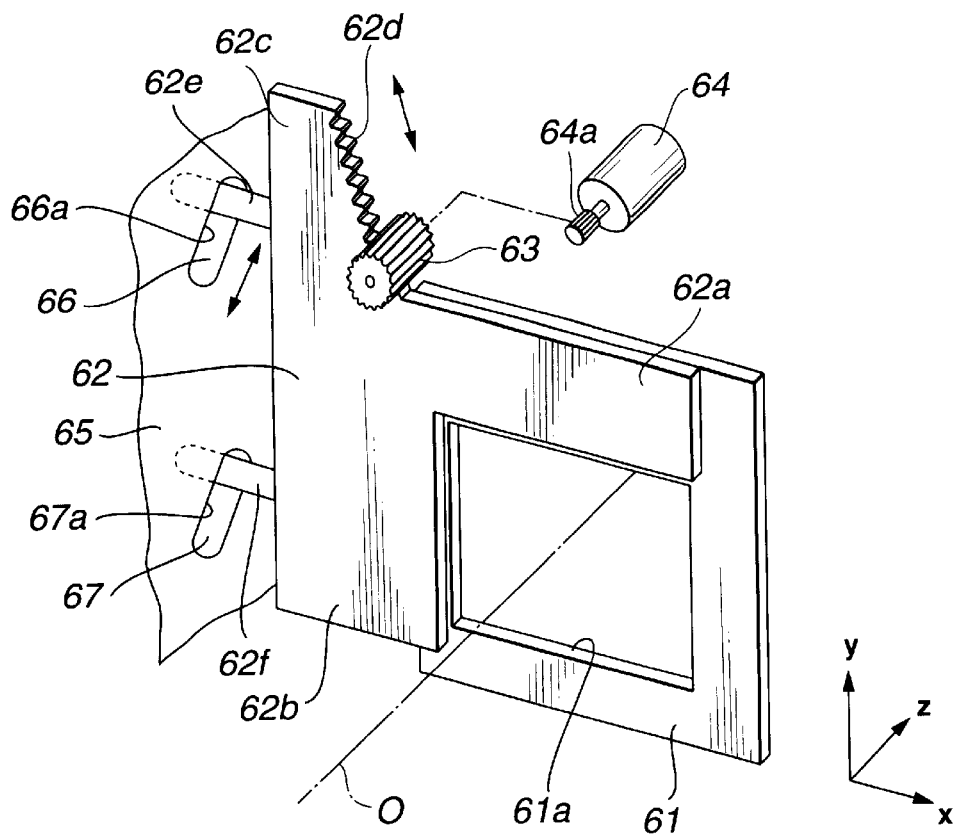
FIG. 9 is a perspective view, of a field frame and a field-correcting frame in a viewfinder apparatus for a camera according to a third embodiment of the present invention.
Figure 10:
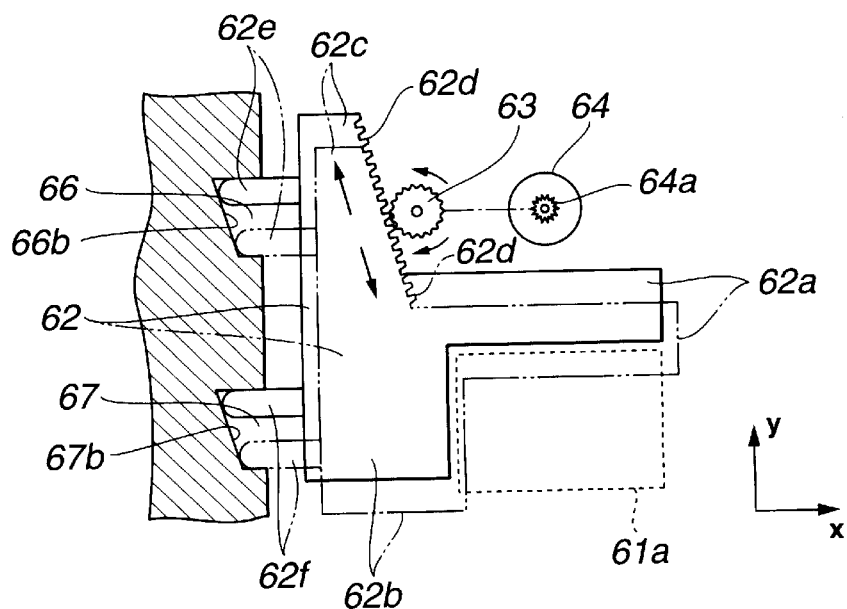
FIG. 10 is a partially cross-sectional front view, of the field-correcting frame of FIG. 9.

FIGS. 9 and 10 illustrate a third embodiment of the present invention. FIG. 9 is a perspective view, showing how a field frame and a field-correcting frame are constructed in a viewfinder apparatus for a camera. FIG. 10 is a partially cross-sectional front view, showing the above field-correcting frame.

In the following description of the third embodiment, descriptions similar to those in the first and second embodiments will be omitted, and only details different from those in the first and second embodiments will mainly be provided.

The camera according to the present embodiment is designed to permit the field-correcting frame to be moved by means of a cam groove into a plane normal to an optical axis and in a direction of the optical axis as well.

As illustrated in FIG. 9, a field frame 61 is a frame member having a rectangular hole 61a for defining a reference visual field of a viewfinder optical system. The field frame 61 is positioned in such a manner that optical axis "O" of the viewfinder optical system extends through substantially the center of the rectangular hole 61a.

In addition, a field-correcting frame 62 is provided so as to allow for a change in a relative position with respect to the field frame 61.

The field-correcting frame 62 has a horizontal shield portion 62a and a vertical shield portion 62b integrally formed into a substantially L-shaped configuration. The former shield portion 62a shields a side of a luminous flux on a horizontal side thereof, while the latter shield portion 62b blocks a side of the luminous flux on a vertical side thereof. The luminous flux travels through the rectangular hole 61a. The field-correcting frame 62 further has a driven portion 62c integrally disposed on and protruding from the above shield portions 62a and 62b. The driven portion 62c has a rack 62d formed on a slanted end surface thereof.

The rack 62d is in mesh with a driving gear 63. The driving gear 63 has a revolving shaft extending in the same direction as that of optical axis "O". The driving gear 63 is formed to have a peripheral length in a direction of the revolving shaft equal to a predetermined length. The driving gear 63 is in mesh with a pinion gear 64a of a clockwise and counterclockwise rotatable motor 64 through a driving force-transmitting system (not shown).

The field-correcting frame 62 has a plurality of cam followers 62e, 62f disposed on and protruding from an outer end surface thereof. The cam followers 62e and 62f are engaged with cam grooves 66 and 67, respectively. The cam grooves 66, 67 are formed in a viewfinder body 65.

The cam grooves 66, 67 have respective slants 66a, 67a formed in a plane defined by a z-axis and a y-axis. The z-axis extends in the same direction as that of optical axis "O", while the y-axis extends upward. As illustrated in FIG. 9, the slants 66a, 67a extend in a direction in which "z" increases with an increase in "y".

Further, cam bottoms of the cam grooves 66, 67 have respective slants 66b, 67b formed in a plane defined by the y-axis and a rightward axis or x-axis. As shown in FIG. 10, the slants 66b, 67b extend in a direction in which "x" decreases with an increase in "y".

In this construction, the field-correcting frame 62 in an initial status lies outside the rectangular hole 61a, while the cam followers 62e, 62f are positioned in abutting contact with uppermost ends of the cam grooves 66 and 67, respectively.

When the motor 64 is rotated in a direction from such an initial status, then the field-correcting frame 62 starts downward movement. As illustrated in FIG. 10, the engagement of the cam followers 62e, 62f with the cam grooves 66, 67 at the slants 66b, 67b permits the field-correcting frame 62 to be inserted into a plane over the rectangular hole 61a. Thus, the slants 66b, 67b at the cam bottoms of the cam grooves 66, 67 form a first driving mechanism for driving the field-correcting frame 62 in a direction substantially normal to optical axis "O" of the viewfinder optical system.

Meanwhile, the engagement of the cam followers 62e, 62f with the cam grooves 66, 67 at the slants 66a, 67a causes the field-correcting frame 62 to be driven in a direction of the optical axis "O" of the viewfinder optical system, more specifically, in a direction toward a minus side of the z-axis (a minus "z" direction). Thus, the slants 66a, 67a of the cam grooves 66, 67 form a second driving mechanism for driving the field-correcting frame 62 in the direction of optical axis "O" of the viewfinder optical system.

The motor 64 is deactivated when the field-correcting frame 62 thus driven is delivered to a desired position. Then, the horizontal and vertical shield portions 62a, 62b of the field-correcting frame 62 block the luminous flux within a required range from running through the rectangular hole 61a.

The motor 64 is reversely rotated when the field-correcting frame 62 must be moved back to the above-mentioned initial position.

Pursuant to the above-described third embodiment, the formation of the cam grooves allows the field-correcting frame to be driven both in the direction substantially vertical to the optical axis of the viewfinder optical system and in the direction of the same optical axis. As a result, the present embodiment provides effects substantially similar to those in the previously described first and second embodiments. In addition, the present embodiment has an advantage in that the field frame and the field-correcting frame according to the third embodiment are formed into planar shapes, and thus members thereof are easy to mold.

In the first, second, and third embodiments, descriptions are made to the field-correcting frame for correcting the parallax between the viewfinder optical system and the photographic optical system; however, the present invention is not limited to the same. For example, a range of a viewfinder field may be designed to vary with a change in size of a photographic image plane in order to obtain similar effects.

Furthermore, the present invention is applicable and operative when a display member or equivalent is inserted into the viewfinder field, if necessary, in order to provide various displays. In this case, an image of an object and the above displays can visually be observed at substantially the same diopter at any position in the viewfinder field. This feature exhibits an effect in which the image of the object and the displays can clearly be observed at one time.

In this invention, it is apparent that a wide range of working modes can be formed on the basis of this invention without departing from the spirit and scope of the invention. This invention is not restricted by any specific embodiment except being limited by the appended claims.

What is claimed is:

1. A viewfinder apparatus for a camera including a viewfinder optical system independent of a photographic optical system, comprising:
    a correction amount-calculating means for calculating a correction amount of parallax between said photographic optical system and said viewfinder optical system on the basis of information concerning at least one of a focal length of said photographic optical system and an object's distance;
    a field frame for defining a reference visual field of said viewfinder optical system;
    a field-correcting frame for correcting the visual field defined by said field frame; and
    a field variable mechanism for moving said field-correcting frame in a direction normal to an optical axis of said viewfinder optical system and in a direction of said viewfinder optical system in accordance with said correction amount of parallax calculated by said correction amount-calculating means;
    wherein said field-correcting frame can be visually observed at a plurality of different positions in the visual field of said viewfinder optical system, said field-correcting frame covering a different portion of the visual field of said viewfinder optical system and disposed at a different point relative to the optical axis of said viewfinder optical system at each of said plurality of positions.

2. The viewfinder apparatus of claim 1, wherein said field-correcting frame and said field frame are curvilinear to correspond with a curvilinear profile of an image-forming surface of said viewfinder optical system.

3. The viewfinder apparatus of claim 1, wherein said field-correcting frame is driveable and rotatable about a revolving shaft in a direction normal to said optical axis of said viewfinder optical system, and is thereby moveable along the curvilinear profile of said image-forming surface of said viewfinder optical system.

4. A viewfinder apparatus for a camera as defined in claim 1, further comprising: a motor for driving said field variable mechanism.

5. The viewfinder apparatus of claim 4, wherein said motor is a driving source for at least one of magnifying power-changing behavior and focus-adjusting behavior in said photographic optical system.

6. A viewfinder apparatus for a camera, comprising:
    a viewfinder optical system separate from a photographic optical system for photographing an image of an object;
    a field-correcting frame for correcting a parallax between said photographic optical system and said viewfinder optical system; and
    a driving mechanism for directing said field-correcting frame in a direction substantially normal to an optical axis of said viewfinder optical system, and in a direction of the optical axis of said viewfinder optical system;
    wherein said field-correcting frame can be visually observed at a plurality of different positions in the visual field of said viewfinder optical system, said field-correcting frame covering a different portion of the visual field of said viewfinder optical system and disposed at a different point relative to the optical axis of said viewfinder optical system at each of said plurality of positions.

7. The viewfinder apparatus of claim 6, further comprising: a single driving source for driving said driving mechanism.

8. The viewfinder apparatus of claim 6, wherein said driving mechanism includes a first driving mechanism for directing said field-correcting frame in a direction substantially normal to said optical axis of said viewfinder optical system and a second driving mechanism for directing said field-correcting frame in a direction of said optical axis of said viewfinder optical system.

9. The viewfinder apparatus of claim 6, wherein said field-correcting frame is moveable and rotatable about a revolving axis in a direction perpendicular to said optical axis of said viewfinder optical system, and is thereby moveable both in the direction substantially normal to said optical axis of said viewfinder optical system and in said direction of said optical axis of said viewfinder optical system.

10. A camera including a viewfinder apparatus, comprising:
    a viewfinder optical system, through which an object can be visually observed; and
    a display member movable both in a direction substantially normal to an optical axis of said viewfinder optical system and in a direction of said optical axis of said viewfinder optical system, said display member being inserted into a visual field of said viewfinder apparatus, thereby allowing said display member to be visually observed,
    wherein said display member can be visually observed at a plurality of different positions in the visual field of said viewfinder optical system so that a different field range is represented when said display member is stationary at each of said plurality of positions, said field-correcting frame covering a different portion of the visual field of said viewfinder optical system and disposed at a different point relative to the optical axis of said viewfinder optical system at each of said plurality of positions.

11. The camera including a viewfinder apparatus of claim 10, wherein said display member is a field-correcting frame for changing said visual field of said viewfinder apparatus.

12. The camera including a viewfinder apparatus of claim 11, wherein said viewfinder optical system is an optical system independent of a photographic optical system in said camera, and wherein said field-correcting frame is moved to correct a parallax between said viewfinder optical system and said photographic optical system.

13. The camera including a viewfinder apparatus of claim 11, further comprising:
   a photographic optical system independent of said viewfinder optical system;
   a distance-measuring device for measuring a distance of an object;
   an arithmetic operating means for calculating a correction amount of parallax between said photographic optical system and said viewfinder optical system on a basis of a measurement result from said distance-measuring device and a focal length of said photographic optical system; and
   a driving mechanism for driving said field-correcting frame in response to a calculation result from said arithmetic operating means.

14. The camera including a viewfinder apparatus of claim 13, wherein said field-correcting frame can be located at a plurality of positions in accordance with said calculation result from said arithmetic operating means.

15. The camera including a viewfinder apparatus of claim 13, wherein said viewfinder optical system includes an objective optical system for forming an image of an object, a reversing optical system for converting such a formed image of the object into an erect image, and an ocular optical system for visually observing the formed image of the object on a magnified scale, and wherein said field-correcting frame is moved in a direction of an optical axis of said viewfinder optical system in such a manner that said field-correcting frame and said image of said object formed by means of said objective optical system are visually observed at substantially the same diopter at any position midway along a course of movement of said field-correcting frame in a direction substantially normal to said optical axis of said viewfinder optical system.

16. The camera including a viewfinder apparatus of claim 13, wherein said photographic optical system and said viewfinder optical system form a magnifying power-changing optical system comprising:
   a magnifying power change-driving mechanism for changing respective magnifying powers of said photographic optical system and said viewfinder optical system; and
   a focal length-detecting means for detection of a state in which said magnifying power of said photographic optical system is changed,
   wherein said arithmetic operating means calculates a correction amount of parallax between said viewfinder optical system and said photographic optical system on a basis of output from said focal length-detecting means and output from said distance-measuring device.

17. The camera including a viewfinder apparatus of claim 16, further comprising: a driving source for driving said driving mechanism and said magnifying power change-driving mechanism.

18. The camera including a viewfinder apparatus of claim 13, wherein said field-correcting frame is rotationally moveable.

19. A camera including a viewfinder apparatus, comprising:
   a viewfinder optical system for visually observing an image of an object;
   a field frame for defining a field range of said viewfinder apparatus; and
   a field-correcting frame for changing the field range defined by said field frame,
   wherein said field-correcting frame can be visually observed at a plurality of different positions in the visual field of said viewfinder optical system so that a different field range is represented when said field-correcting frame is stationary at each of said plurality of positions, said field-correcting f&me covering a different portion of the visual field of said viewfinder optical system, and disposed at a different point relative to the optical axis of said viewfinder optical system at each of said plurality of positions.

20. The camera including a viewfinder apparatus of claim 19, further comprising: a driving mechanism for driving said field-correcting frame, in which said driving mechanism drives said field-correcting frame both in a direction normal to an optical axis of said viewfinder optical system and in a direction of the optical axis of said viewfinder optical system when the field range is changed.

21. The camera including a viewfinder apparatus of claim 19, further comprising:
   a distance-measuring device for measuring a distance of said object;
   an arithmetic operating means for calculating a correction amount of parallax between said photographic optical system and said viewfinder optical system on a basis of information regarding at least one of a measurement result from said distance-measuring device and a focal length of said photographic optical system; and
   a driving mechanism for driving said field-correcting frame,
   wherein said field-correcting frame is driven in accordance with a calculation result from said arithmetic operating means.

22. The camera including a viewfinder apparatus of claim 19, wherein said photographic optical system has a single focal length; and further comprising:
   a distance-measuring device for measuring a distance of said object;
   an arithmetic operating means for calculating a correction amount of parallax between said photographic optical system and said viewfinder optical system on a basis of a measurement result from said distance-measuring device; and
   a driving mechanism for driving said field-correcting frame,
   wherein said field-correcting frame is driven in accordance with a calculation result from said arithmetic operating means.

23. The camera including a viewfinder apparatus of claim 21, wherein said photographic optical system is a magnifying power-changing optical system comprising:
   a photographic optical system's magnifying power-changing mechanism for changing a magnifying power of said photographic optical system; and
   a detecting means for detecting a focal length of said photographic optical system,
   wherein said arithmetic operating means calculates a correction amount of parallax on a basis of a measurement result from said distance-measuring device and a detection result from said detecting means.

* * * * *